United States Patent
Michalsky et al.

(10) Patent No.: US 12,025,753 B2
(45) Date of Patent: Jul. 2, 2024

(54) TEST DEVICE FOR TESTING A DISTANCE SENSOR OPERATING WITH ULTRASONIC WAVES

(71) Applicant: dSPACE digital signal processing and control engineering GmbH, Paderborn (DE)

(72) Inventors: Thomas Michalsky, Paderborn (DE); Haitz Aguirre Urizar, Paderborn (DE)

(73) Assignee: dSPACE GMBH, Paderborn (DE)

( * ) Notice: Subject to any disclaimer, the term of this patent is extended or adjusted under 35 U.S.C. 154(b) by 271 days.

(21) Appl. No.: 17/148,066

(22) Filed: Jan. 13, 2021

(65) Prior Publication Data

US 2021/0239816 A1    Aug. 5, 2021

(30) Foreign Application Priority Data

Feb. 5, 2020   (DE) .................... 10 2020 102 851.2

(51) Int. Cl.
*G01S 7/52*       (2006.01)
*G01S 15/08*      (2006.01)

(52) U.S. Cl.
CPC .......... *G01S 7/52004* (2013.01); *G01S 15/08* (2013.01); *G01S 2007/52007* (2013.01)

(58) Field of Classification Search
None
See application file for complete search history.

(56) References Cited

U.S. PATENT DOCUMENTS

| | | | | |
|---|---|---|---|---|
| 2,902,673 A | * | 9/1959 | Hare | G01S 1/72 367/122 |
| 3,149,195 A | * | 9/1964 | Cutler | G01S 7/4021 703/3 |

(Continued)

FOREIGN PATENT DOCUMENTS

| | | | | |
|---|---|---|---|---|
| CN | 107505604 A | * | 12/2017 | ........... G01S 7/4052 |
| CN | 206740968 U | * | 12/2017 | |

(Continued)

OTHER PUBLICATIONS

Engelhardt, Maximilian, Florian Pfeiffer, and Erwin Biebl. "A high bandwidth radar target simulator for automotive radar sensors." 2016 European radar conference (EuRAD). IEEE, 2016. (Year: 2016).*

(Continued)

*Primary Examiner* — Yuqing Xiao
*Assistant Examiner* — Jonathan D Armstrong
(74) *Attorney, Agent, or Firm* — Muncy, Geissler, Olds & Lowe, P.C.

(57) ABSTRACT

A test device for testing a distance sensor operating with ultrasonic waves, wherein the distance sensor to be tested comprises at least a sensor radiating element for emitting a transmission signal and a sensor receiving element for receiving a reflected signal. For effective and accurate testing and stimulation of the distance sensor, the test device has a test receiving element for receiving ultrasonic waves emitted from the distance sensor to be tested, and at least one test radiating element for radiating test ultrasonic waves, and a signal processing unit, wherein ultrasonic waves received by the test receiving element are transmitted as a received signal to the signal processing unit and the signal processing unit, as a function of the received signal and simulation distance information relating to a distance to be simulated, (Continued)

and determines an excitation signal for the test radiating element.

9 Claims, 4 Drawing Sheets

(56) References Cited

U.S. PATENT DOCUMENTS

| | | | | |
|---|---|---|---|---|
| 3,369,070 | A * | 2/1968 | Nicht | G01S 7/4052 |
| | | | | 434/2 |
| 3,392,367 | A * | 7/1968 | Massa | G01S 1/72 |
| | | | | 367/1 |
| 3,916,676 | A * | 11/1975 | Boggs | G01R 31/59 |
| | | | | 73/609 |
| 3,983,530 | A * | 9/1976 | Johannessen | G01S 7/52004 |
| | | | | 367/13 |
| 4,022,058 | A * | 5/1977 | Brown | G01F 1/667 |
| | | | | 73/861.28 |
| 4,656,481 | A * | 4/1987 | Mawhinney | G01S 7/40 |
| | | | | 73/1.01 |
| 5,122,989 | A * | 6/1992 | Pirie | G01S 15/74 |
| | | | | 367/13 |
| 6,150,976 | A * | 11/2000 | Cooley | G01S 7/4052 |
| | | | | 342/170 |
| 10,120,073 | B2 | 11/2018 | Schumann et al. | |
| 2002/0118599 | A1* | 8/2002 | Deveau | G01S 7/52004 |
| | | | | 367/13 |
| 2003/0039171 | A1* | 2/2003 | Chiapetta | G01S 15/88 |
| | | | | 367/98 |
| 2005/0265123 | A1* | 12/2005 | Pope | B63C 11/26 |
| | | | | 367/99 |
| 2013/0099943 | A1* | 4/2013 | Subramanya | G01S 13/91 |
| | | | | 340/933 |
| 2019/0331482 | A1* | 10/2019 | Lawrence | G01S 7/4026 |
| 2021/0215796 | A1* | 7/2021 | Fischer | G01S 7/521 |

FOREIGN PATENT DOCUMENTS

| | | | | |
|---|---|---|---|---|
| DE | 10 2004 033 047 A1 | 2/2006 | | |
| DE | 10 2007 031 040 A1 | 1/2009 | | |
| DE | 102009039716 B3 * | 1/2011 | | G01N 29/07 |
| DE | 102011015094 A1 * | 9/2012 | | G01S 7/295 |
| DE | 102013108001 A1 * | 2/2014 | | G01N 29/32 |
| DE | 10 2013 211 846 A1 | 12/2014 | | |
| DE | 10 2014 017 831 A1 | 6/2016 | | |
| DE | 10 2014 118 625 A1 | 6/2016 | | |
| DE | 102014017831 A1 * | 6/2016 | | |
| DE | 102014118625 A1 * | 6/2016 | | |
| DE | 102017118096 B3 * | 7/2018 | | G01S 15/931 |
| DE | 102017118099 B3 * | 7/2018 | | G01S 15/931 |
| DE | 102017118101 B3 * | 7/2018 | | G01S 15/931 |
| DE | 102017118102 B3 * | 7/2018 | | G01S 15/931 |
| DE | 102017118103 B3 * | 7/2018 | | G01S 15/931 |
| DE | 102017118105 B3 * | 7/2018 | | G01S 15/931 |
| DE | 102017118107 B3 * | 7/2018 | | G01S 15/931 |
| DE | 102017205720 A1 * | 10/2018 | | |
| DE | 10 2018 121 543 A1 | 3/2019 | | |
| DE | 102018121543 A1 * | 3/2019 | | |
| DE | 102018107838 A1 * | 10/2019 | | |
| EP | 0571566 B1 | 10/1997 | | |
| EP | 1770409 A1 * | 4/2007 | | G01S 13/10 |
| GB | 929487 A * | 6/1963 | | |
| GB | 2468899 A * | 9/2010 | | B60C 23/0408 |
| JP | S5957181 A | 4/1984 | | |
| JP | H08248129 A | 9/1996 | | |
| JP | 2667637 B2 * | 10/1997 | | |
| JP | H11160418 A | 6/1999 | | |
| JP | 2003307565 A | 10/2003 | | |
| JP | 2004069117 A | 3/2004 | | |
| KR | 20170051359 A * | 5/2017 | | |
| KR | 20200035106 A * | 4/2020 | | |
| KR | 102157507 B1 * | 9/2020 | | |
| WO | WO-9531130 A1 * | 11/1995 | | G01S 15/894 |
| WO | WO-2018184825 A1 * | 10/2018 | | |
| WO | WO-2018220629 A1 * | 12/2018 | | G01S 13/755 |

OTHER PUBLICATIONS

German Office Action for German Application No. 102020102851.2 dated Nov. 2, 2020 with English translation.

Chen et al., "Autonomous Vehicle Testing and Validation Platform: Integrated Simulation System with Hardware in the Loop," IEEE Intelligent Vehicles Symposium, pp. 949-956 (Jun. 26-30, 2018).

Lim et al., "Autonomous Vehicle Ultrasonic Sensor Vulnerability and Impact Assessment," IEEE, pp. 231-236 (2018).

Trent et al., "An FPGA-based Portable Real-time Obstacle Detection and Notification System," Int'l Conf on Electrical, Electronics & Optimization Techniques (ICEEOT), pp. 1954-1958 (2016).

* cited by examiner

TEST DEVICE FOR TESTING A DISTANCE SENSOR OPERATING WITH ULTRASONIC WAVES

This nonprovisional application claims priority under 35 U.S.C. § 119(a) to German Patent Application No. 10 2020 102 851.2, which was filed in Germany on Feb. 5, 2020, and which is herein incorporated by reference.

BACKGROUND OF THE INVENTION

Field of the Invention

The present invention relates to a test device for testing a distance sensor operating with ultrasonic waves, wherein the distance sensor to be tested comprises at least one sensor radiating element for radiating a transmission signal and a sensor receiving element for receiving a reflected signal.

Description of the Background Art

The distance sensor described above, which operates with ultrasonic waves, is not itself a component of the test device considered here, but is the object to be tested. Such distance sensors are used in a wide range of technical applications, for example in the process industry, in automation technology, and above all in the automotive sector. Here it is known that such distance sensors primarily monitor the close range of a motor vehicle, in contrast to radar distance sensors, for example, which are also and above all suitable for monitoring the surroundings of a vehicle even at much greater distances.

The measurement of a distance between the distance sensor and an object carried out by the distance sensor to be tested is based on the principle of time-of-flight measurement, i.e. measuring the time required for a transmitted signal in the form of an ultrasonic wave to travel from the distance sensor to an object to be detected and to return to the distance sensor as a signal reflected from this object. Knowing the propagation speed of the ultrasonic wave in free space (determination of the propagation speed, if necessary, taking into account the propagation medium, ambient temperature, humidity, etc.), the distance between the distance sensor and the object to be detected, which of course must be in the radiation range of the ultrasonic distance sensor, is directly determined.

There are various situations in which the functionality of a distance sensor operating with ultrasonic waves should be checked. This can be a normal function test as part of a plant or vehicle overhaul, the acceptance of a device in which the distance sensor is installed after completion of the device, a function check after a distance sensor or a component in which the distance sensor is installed has been replaced. Finally, it can also be a complex test scenario in which the functionality of the distance sensor and the control unit connected to it is tested by means of a simulated environment.

To check the functionality of a distance sensor, test devices are known from the prior art that consist of a physical object that is positioned at a certain distance in the radiation range of the distance sensor to be tested, so that it can be checked whether the distance sensor—and the evaluation electronics connected to it—correctly detects the distance to the object. This test method with an object that can be placed—automatically or manually—is cumbersome and possibly also imprecise for various reasons. One disadvantage is, for example, that the object distances to be checked must also be realizable in the test environment, that the positioning of the real physical object is time-consuming and comparatively awkward to check.

SUMMARY OF THE INVENTION

It is therefore an object of the present invention to provide a test device with which a distance sensor to be tested and operating with ultrasonic waves can be easily checked.

In the abovementioned test device, the object derived and shown above is first and essentially achieved in that the test device comprises a test receiving element for receiving the ultrasonic waves emitted by the distance sensor to be tested and at least one test radiating element for radiating test ultrasonic waves, in that the test device further comprises a signal processing unit, wherein ultrasonic waves received by the test receiving element are transmitted as a received signal to the signal processing unit, and wherein the signal processing unit determines an excitation signal for the test radiating element, delayed in accordance with the simulation distance information, as a function of the received signal and simulation distance information relating to a distance to be simulated, and transmits it to the test radiating element, wherein the test radiating element generates corresponding test ultrasonic waves and radiates them onto the distance sensor to be tested.

The basic idea in the aforementioned test device is therefore that the test device receives the ultrasonic signal of the distance sensor to be tested via its test receiver element and forwards it as a received signal to an electronic signal processing unit, which is usually implemented by an embedded computer system with one or more digital signal processors. The signal processing unit then electronically generates a delayed excitation signal, the delay being determined as a function of simulation distance information. This simulation distance information corresponds to the distance to be simulated to the distance sensor to be tested. Thus, in the operation of the test device, it does not matter at all how far away the test device actually is from the distance sensor to be tested, since the signal propagation delay associated with a distance to be simulated is electronically simulated to the distance sensor to be tested. Another advantage of the test device is that it does not need to have any knowledge of the mode of operation of the distance sensor to be tested, since it detects the transmitted signal emitted by the distance sensor to be tested metrologically by means of the test receiving element and determines the excitation signal that excites the test radiating element on this basis.

In the case of the test device, a conceptual distinction is made between the test receiving element for receiving ultrasonic waves and the test radiating element for radiating test ultrasonic waves. In practice, the test receiving element and the test radiating element represent a single ultrasonic receiving and transmitting element, as is also known from the prior the art for distance sensors and as also applies to most ultrasonic sensors in metrological use. A membrane excited by a piezo element, for example, serves both to emit ultrasonic signals and, conversely, to receive ultrasonic signals. Of course, the test receiving element and the test radiating element can also be implemented physically separately.

Even if the test device is positioned in the immediate vicinity, for example at a distance of a few centimeters, in front of the distance sensor to be tested, it can be used to simulate considerably larger distances without difficulty, since the received signal can be delayed by the signal processing unit practically at will, which corresponds to any propagation delay of the transmitted signal emitted by the distance sensor to be tested and thus to any distance. Thus, the test device does not require an extended test environment in order to be able to simulate corresponding object distances, which of course brings great advantages.

The test device described above can also be used advantageously in a very complex test scenario, which includes testing the functionality of a distance sensor or also several distance sensors, which are connected to a control unit and are also in their usual installation situation, for example in the bumper of a motor vehicle, in a simulated environment. For this purpose, the environment of the distance sensor to be tested—or also of several distance sensors to be tested—is calculated in real time in parts or also completely by means of a powerful simulation environment. For example, a real vehicle with real ECUs and real distance sensors can be moved through a virtual environment. For this purpose, the simulation environment generates physical signals that are, for example, input signals of various ECUs of the real vehicle body, wherein the simulation environment picks up the output signals generated by these ECUs and incorporates them into the real-time simulation. A real hardware (vehicle) can thus be tested safely in a simulated environment under practically "real" conditions. How realistic the test is depends on the quality of the simulation environment and the simulation calculated on it. In the present case, too, a distance sensor to be tested can thus be tested with or without a connected ECU in a closed control loop, which is why such test scenarios are also referred to as hardware-in-the-loop tests or vehicle-in-the-loop (VIL) tests if the hardware is a vehicle. It is readily apparent that the test device for testing a distance sensor operating with ultrasonic waves is suitable for implementing a distance simulation within the simulation environment.

An exemplary embodiment of the test device is characterized by the fact that test device distance information concerning the distance between the test device and the distance sensor to be tested is stored in the signal processing unit, and the signal processing unit additionally takes this test device distance information into account when determining the delayed excitation signal. By taking the test device distance information into account, the fact is taken into account that a part of the distance to be simulated—corresponding to the simulation distance information—is actually traversed in free space by the transmitted signal emitted by the distance sensor, and also a corresponding distance is traversed by the test ultrasonic waves emitted by the test radiating element. This physically realized distance then no longer needs to be simulated by the signal processing unit in the form of a corresponding delay time. In such applications where the test device is positioned in the immediate vicinity of the distance sensor to be tested or is placed directly on the distance sensor to be tested, the test device distance is practically zero and therefore does not have to be taken into account.

A further advantageous design of the test device is characterized by the fact that the amplitude of the excitation signal and thus the amplitude of the test ultrasonic waves is determined by the signal processing unit as a function of the amplitude of the received signal, preferably additionally as a function of the simulation distance information, particularly preferably as a function of the test device distance information. By this measure it is possible to be able to simulate also a possible weakening/amplification of the simulated reflected signal. This is particularly useful if the distance sensor to be tested also evaluates the amplitude of the reflected signal it receives. The amplitude of the reflected signal depends in a rather clear way on the distance to be simulated. For example, if the test device is positioned at a distance of one centimeter in front of the distance sensor to be tested, but a considerably larger object distance—corresponding to the simulation distance information—is to be simulated, then, on the one hand, the attenuation of the received signal that it would experience on the way to the reflection object under simulation must be taken into account, and, on the other hand, the attenuation of the reflected signal on the way back from the reflection object under simulation to the distance sensor to be tested must also be taken into account. The signal weakening takes place here in good approximation with the distance square.

In this context, an advantageous further design of the test device provides that the amplitude of the excitation signal and thus the amplitude of the test ultrasonic waves is determined by the signal processing unit as a function of object information, in particular the effective reflection surface of the object and/or the reflection properties of the reflection surface of the object and/or the contour of the reflection surface of the object. Taking these properties of the object into account offers the possibility of simulating an obstacle to be simulated with greater realism. For example, the effective reflection surface of the object determines how large a portion of the ultrasonic waves emitted by the distance sensor to be tested will actually be reflected. For example, it is significant whether a distance sensor to be tested is facing a large-area wall or only a comparatively narrow pillar. The reflection properties of the object are also of interest, i.e. whether the distance sensor to be tested is facing a smooth concrete wall, for example, or a leafy bush, for example; this is decisive for the reflection behavior. The aforementioned properties of the object also include, for example, the angle of inclination of a reflection surface, which is decisive for the direction of travel of the reflected signal. The information of the reflection angle can be decisively used to determine which part of the reflected signal runs back to the emitting distance sensor to be tested and which part is possibly reflected into an area next to the distance sensor to be tested and is possibly detected there by other distance sensors.

A further advantageous development of the test device is characterized in that the excitation signal and thus the test ultrasonic waves have a frequency, the frequency being constant or time-variable. Such signals can be generated very easily. For example, the test ultrasonic waves having a frequency can be harmonic oscillations (e.g. sinusoidal signal), but they can also be a pulse train with a certain frequency and/or frequency change. With this approach, an analysis of the received signal does not necessarily have to precede; the test device here ultimately generates a signal of a predetermined type as test ultrasonic waves. By varying the frequency of the test ultrasonic waves, for example, a change in distance can also be simulated, at least if it is assumed that the transmitted signal of the distance sensor to be tested does not itself already have a modulation of the frequency.

The received signal can be sampled at high frequency by the signal processing unit and stored, and the sampled received signal is transmitted at least indirectly as an output signal to the test radiation unit. The advantage of this approach is that practically an exact copy of the received signal is used as the excitation signal. If, for example, the distance sensor to be tested has a transmission signal that is coded in a certain way, for example in that it is modulated in some way, then this coding is automatically detected by the test device and also output again by correspondingly coded test ultrasonic waves. It is conceivable that a distance sensor to be tested has such a coding, for example in order to be able to distinguish transmitted signals generated by itself from the transmitted signals of other distance sensors. Preferably, the sampling rate is at least twice as high as the highest frequency component of interest of the transmitted signal emitted by the distance sensor to be tested. Preferably, the sampling rate is at least ten times as high as the highest frequency component of interest of the transmitted signal emitted by the distance sensor to be tested. Ultrasonic frequencies in the range of 20 kHz to 100 kHz are used in many technical applications. Such signals can easily be sampled by a suitable signal processing system even at significantly higher frequencies for the purpose of unambiguous reconstruction of the sampled received signal. When it is said that the sampled received signal is transmitted at least indirectly as an output signal to the test radiation unit, this means that additional changes can also be made to the output signal before it reaches the test radiation unit, for example it can be attenuated, smoothed or modulated in an additional way.

The received signal can be evaluated as a received signal by the signal processing unit only above a predetermined or calculated intensity threshold, in particular above a predetermined or calculated amplitude of the received signal. In particular, a duration of the received signal is calculated by the signal processing unit from the duration of the received signal exceeding a predetermined or calculated amplitude of the received signal. Preferably, the duration of the received signal corresponds to the duration of the output signal determined by the signal processing unit.

On the one hand, the measure can be used to ensure that the test device does not react to just any detected received signal. On the other hand, by determining the duration of the received signal, it can then again be decided by the signal processing unit how long a generated excitation signal lasts so that it corresponds with the received signal. This is also of particular importance if an excitation signal of a predetermined type (for example a sine signal) is generated.

In this context, it has proven advantageous if the signal processing unit determines as a single coherent received signal those signal components of a received signal which have a predetermined minimum intensity or lie within a time window of predetermined size between two signal components with predetermined minimum intensity. In this way, it is also possible to detect signals with very strongly varying intensity curves as a single coherent signal.

A spacer with a defined length can be arranged in the radiation direction of the test radiating element in such a way that the test device can be placed at a defined distance on the distance sensor to be tested or the mounting location of the distance sensor to be tested. This design has the advantage that, on the one hand, only very little space is required for testing a distance sensor and, on the other hand, the spacer ensures that a fixed test device distance information is used, which is predetermined by the design.

Further, the signal processing unit can operate the test device as a distance sensor by a measurement signal being transmitted via the test radiating element and a reflected signal being detected by the test receiving element and being transmitted as a received signal to the signal processing unit, and the signal processing unit determining the signal propagation time and determining distance information from the signal propagation time, in particular wherein the determined distance information is stored as test device distance information.

It is also provided that, in addition to the one test radiating element, at least one further test radiating element may be included, that the signal processing unit determines and transmits to the test radiating elements a plurality of delayed excitation signals for the test radiating elements as a function of the received signal and the simulation distance information, and that the test radiating elements generate corresponding test ultrasonic waves and radiate them onto the distance sensor to be tested, in particular onto a plurality of sensor receiving elements of the distance sensor to be tested.

This measure makes it possible to test a composite of several distance sensors in a physically consistent manner. For example, there is the situation where several distance sensors are installed in a bumper of a motor vehicle, wherein the received reflected signals of these distance sensors are evaluated together, for example to obtain additional information about the reflection object by means of data fusion. A simple example here is triangulation, by means of which, in addition to the pure distance information of the object from a distance sensor, the direction of the object in relation to a distance sensor can also be determined. In the previous embodiment, the test device is able to simulate various reflection object properties and also to supply spatially distributed distance sensors with physically consistent reflection data. In an advantageous embodiment of the test device, the various test radiating elements are alignable, for example alignable on a plurality of distance sensors to be tested.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
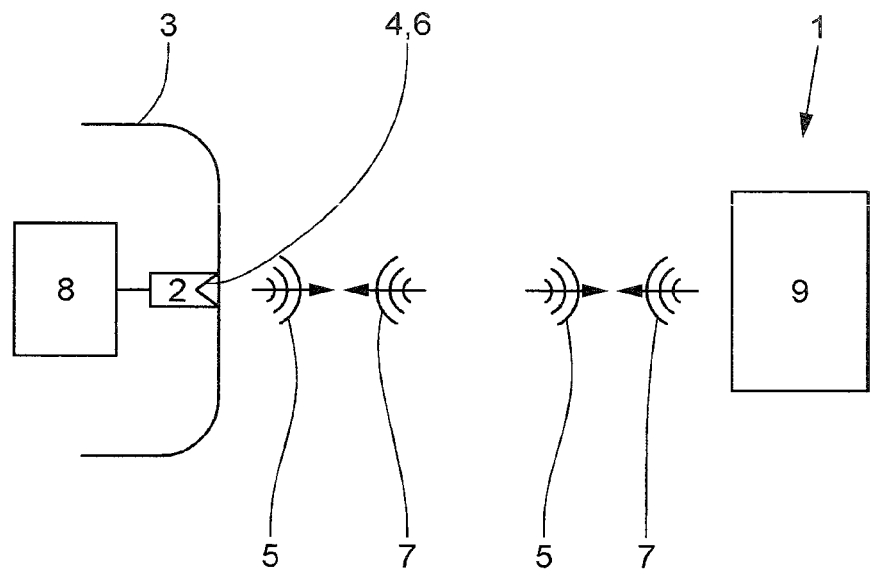
FIG. 1 is a test device from the conventional art in the form of a real physical object.

FIGS. 1 to 4, 6 and 7 each show a test device 1 for testing a distance sensor 2 operating with ultrasonic waves. In embodiments 1 to 3 and 7, it is shown that the distance sensor 2 to be tested is installed in an operational environment; a bumper 3 is in each case indicated schematically here.

The distance sensor 2 to be tested has a sensor radiating element 4 for radiating a transmission signal 5 and a sensor receiving element 6 for receiving a reflected signal 7. In FIGS. 1 to 3 and 7, it is shown schematically in each case that the distance sensor 2 to be tested is connected to a control unit 8, via which the distance sensor 2 is controlled and with which the signals received from the distance sensor 2 are evaluated. In the distance sensors 2 shown schematically, the sensor radiating element 4 and the sensor receiving element 6 are formed by a single common transmitting and receiving unit, with which both the transmission signals 5 are generated and with which the reflected signals 7 are also received. The reflected signal 7 is—hence the name—an ultrasonic signal reflected by an object 9 (see FIG. 1), i.e. usually the reflected transmission signal 5.

The issue of interest here is to check the shown distance sensors 2 in as reliable and effective a manner as possible for their functionality, or to simulate an environment for the depicted distance sensors 2 in as reliable and effective a manner as possible. Such a check can be of interest in various situations, for example as a functional test after manufacture of the distance sensors, after replacement of a distance sensor in an installation situation (workshop), during official inspections, etc.

FIG. 1 shows the basic relationships, wherein the transmitted signal 5 is reflected at the object 9 and returns to the distance sensor 2 as a reflected signal 7. It is known from the prior art to use a "real" physical object 9 as a test device for testing the distance sensor 2, and to position said object with the required accuracy in the radiation range of the distance sensor 2, as shown in FIG. 1. It is therefore necessary to position the real object 9, which in this sense can therefore also be understood as the "test device" 1, at the distance to be checked, which is recognizably costly.

Even though FIGS. 1 to 3 and 7 show the distance sensor 2 to be tested, the distance sensor 2 to be tested is of course not part of the claimed test device. However, the illustration of the distance sensor 2 to be tested and the explanation of its operation facilitate the description of the operation of the claimed test device 1.

FIGS. 2 to 4, 6 and 7 each show a test device 1 with which it is possible to simulate a reflected signal 7 to the distance sensor 2 to be tested. The illustrated test devices 1 each have a test receiving element 10 for receiving ultrasonic waves 5 emitted from the distance sensor 2 to be tested, and a test radiating element 11 for radiating test ultrasonic waves 12. In addition, the test devices 1 each also have a signal processing unit 13. In all cases, the test devices 1 are configured such that ultrasonic waves 5 received by the test receiving element 10 are transmitted as a received signal $S_{RX}$ to the signal processing unit 13, and the signal processing unit 13 determines an excitation signal $S_{TX}$ for the test radiating element 11, which is delayed in accordance with the simulation distance information $d_{sim}$, as a function of the received signal $S_{RX}$ and a simulation distance information $d_{sim}$ relating to a distance to be simulated, and transmits said excitation signal $S_{TX}$ to the test radiating element 11. The test radiating element 11 generates corresponding test ultrasonic waves 12 and radiates these to the distance sensor 2 to be tested. The distance sensor 2 to be tested interprets the test ultrasonic waves 12 as a reflected signal.

The test device 1 thus operates completely independently of the distance sensor 2 to be tested, apart from the fact that the transmitting device 1 must of course receive a transmission signal 5 from the distance sensor 2 to be tested. Beyond that, however, the test device 1 does not require any further information from and about the distance sensor 2 to be tested or from the components connected to the distance sensor 2 to be tested, for example from the control unit 8 shown in FIGS. 2, 3 and 7. The test device 1 can therefore operate completely independently of the distance sensor 2 to be tested.

Figure 2:
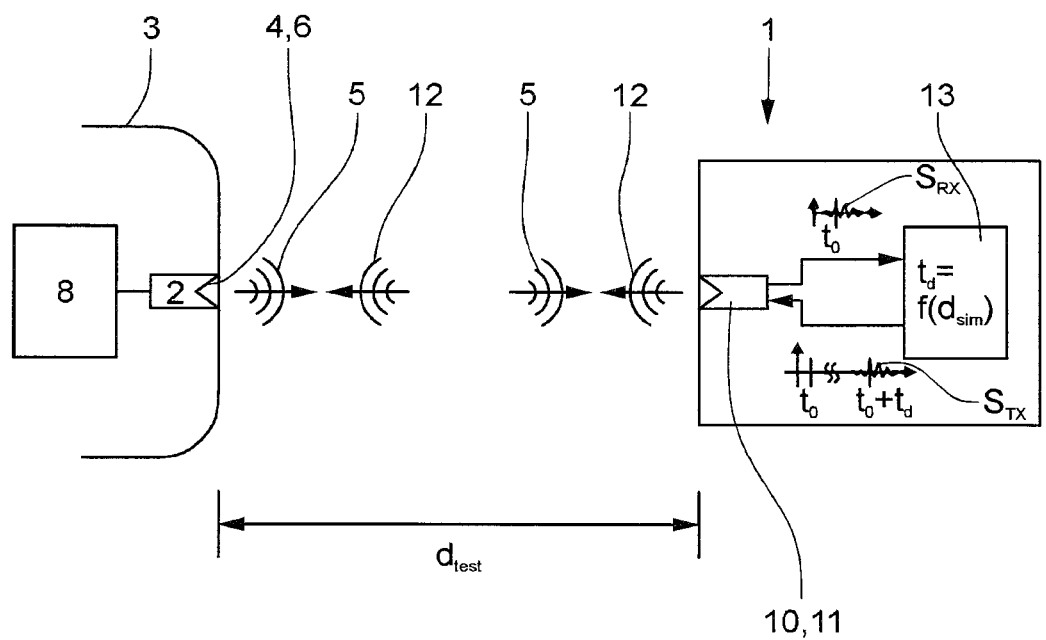
FIG. 2 is a schematic view of an exemplary embodiment of a test device according to the invention.

FIG. 2 (and also some subsequent figures) indicate that the signal processing unit 13 receives the received signal $S_{RX}$ at a time $t_0$. Using the simulation distance information $d_{sim}$, the signal processing unit 13 then calculates a delay time $t_d$, which thus corresponds to the time with respect to the reception time $t_0$ after which the excitation signal $S_{TX}$ is transmitted to the test radiating element 11 with a delay. The signal processing unit 13 thus calculates the time delay required to simulate a corresponding propagation delay of an ultrasonic signal to the distance sensor 2 to be tested.

Figure 3:
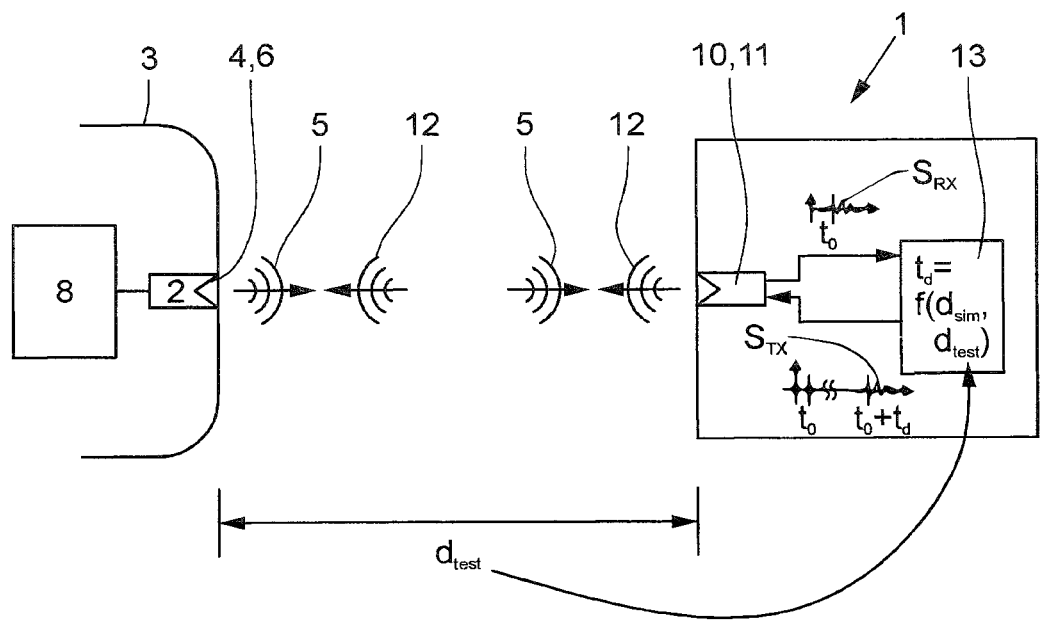
FIG. 3 is a schematic view of an exemplary embodiment of a test device according to the invention.

For very small real distances $d_{test}$ between the distance sensor 2 to be tested and the test device 1 or the test radiating element 11 of the test device 1, knowledge of the simulation distance information $d_{sim}$ is sufficient for calculating the delay time $t_d$. However, the greater the distance of the test device 1 from the distance sensor 2 to be tested, the more important it is to know this distance in the form of the test device distance information $d_{test}$, which is shown in FIG. 3. Here, the signal processing unit 13 has knowledge of the test device distance information $d_{test}$ concerning the distance between the test device 1 and the distance sensor 2 to be tested. The signal processing unit 13 additionally takes this test device distance information $d_{test}$ into account when determining the delayed excitation signal $S_{TX}$, since the real propagation delay of the test ultrasonic waves 12 over the distance $d_{test}$ must not be included again in the calculation of the delay time $t_d$, but rather must be factored out here.

Figure 4:
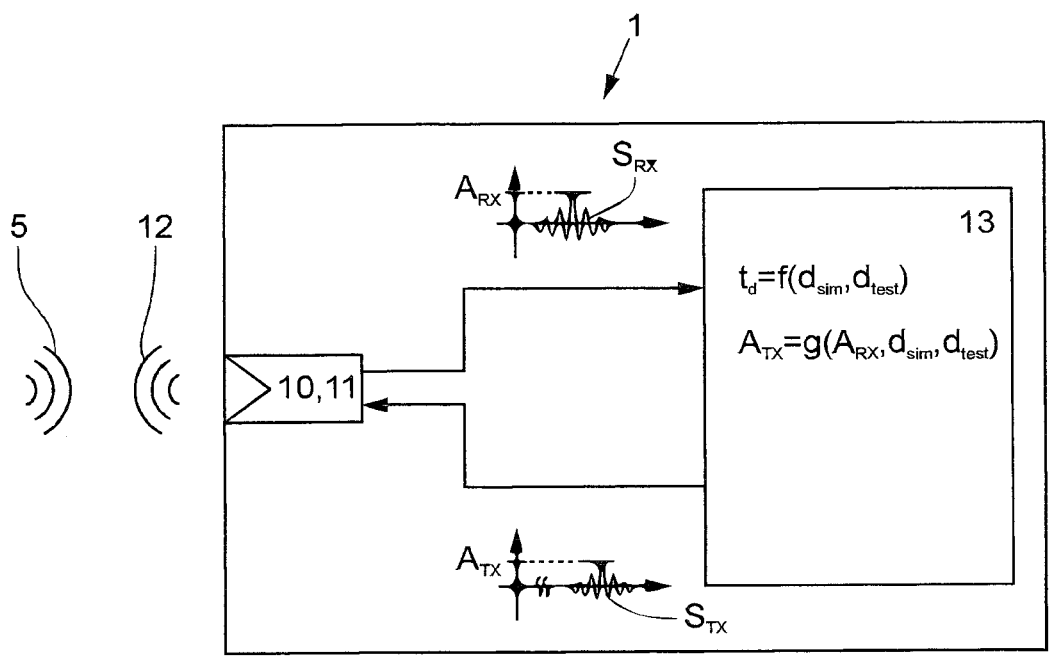
FIG. 4 is an exemplary of a test device according to the invention taking signal amplitudes into account.

In the exemplary embodiment of the test device 1 shown in FIG. 4, the signal processing unit 13 determines the amplitude $A_{TX}$ of the excitation signal $S_{TX}$ and thus the amplitude of the test ultrasonic waves 12 as a function of the amplitude $A_{RX}$ of the received signal $S_{RX}$. This is useful because the transmitted signal 5 emitted by the distance sensor 2 to be tested naturally undergoes attenuation along its path. In the interest of physically consistent generation of the excitation signal $S_{TX}$ and thus of the test ultrasonic waves 12, the amplitude $A_{TX}$ of the excitation signal $S_{TX}$ should therefore be adjusted. For the reasons already described with regard to FIG. 3, the signal processing unit 13 additionally takes into account the simulation distance information $d_{sim}$ and also the test device distance information $d_{test}$ when determining the amplitude $A_{TX}$ of the excitation signal $S_{TX}$ ($A_{TX}=g(A_{RX}, d_{sim}, d_{test})$).

In a further development of the test device 1 shown in FIG. 4, the signal processing unit 13 determines the amplitude $A_{TX}$ of the excitation signal $S_{TX}$, and thus the amplitude of the test ultrasonic waves 12, by additionally taking into account object information, i.e. information about the object to be simulated, which is simulated by the test device 1, and whose reflected signals are simulated. Thus, it is taken into account here that various object properties influence the reflectivity for ultrasonic waves. In this test device 1, which is not explicitly shown here, the object information $O_i$ taken into account is the effective reflection area of the object, the reflection characteristics of the reflection area of the object, which includes the orientation of the reflection area in space.

Thus, the amplitude $A_{TX}$ of the excitation signal $S_{TX}$ is additionally a function of the object information $O_t$ ($A_{TX}$=g ($A_{RX}$, $d_{sim}$, $d_{test}$, $O_t$)).

In the test device 1 shown in the figures, a "copy" of the received signal $S_{RX}$ is basically used as the excitation signal $S_{TX}$. For this purpose, it is provided that the received signal $S_{RX}$ is sampled at high frequency by the signal processing unit 13 and stored, and the sampled received signal is transmitted at least indirectly as an output signal $S_{TX}$ to the test radiation unit 11. The signal processing unit 13 shown here samples the received signal $S_{RX}$ at a sampling rate that is significantly more than twice as high as the highest frequency signal portion of interest of the received signal $S_{RX}$. The excitation signal $S_{TX}$ may of course undergo further changes, for example attenuation, temporal compression or stretching, etc.

An alternative approach for test devices here is to generate the excitation signal and thus the test ultrasonic waves according to a fixed waveform, i.e., independent of the appearance of the received signal. For example, a harmonic signal is then simply generated with a sine generator or pulse trains with a fixed shape. This approach is possible if the shape of the received signal is known or if, for example, it is known that the distance sensor to be tested does not analyze the reflected signal it receives in more detail. This can be the case, for example, if the transmitted signal generated by the distance sensor to be tested is not coded, and the distance sensor to be tested consequently does not check whether the signal it has received has also been emitted by it.

Figure 5:
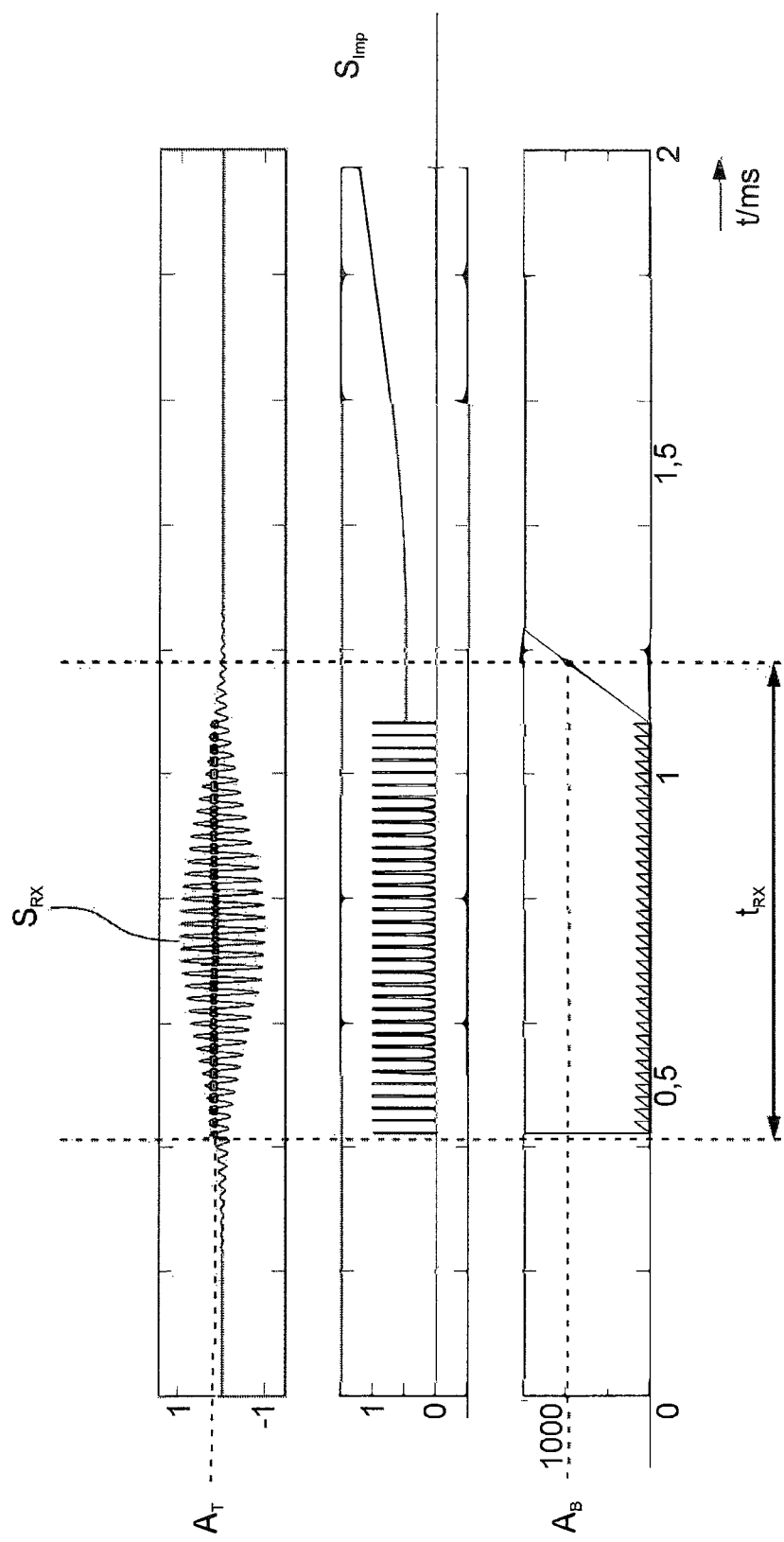
FIG. 5 is a schematic view of a method implemented in the test device for determining the duration of a received signal.

FIG. 5 shows a special feature of the signal processing by the signal processing unit 13. The received signal $S_{RX}$ is evaluated as a received signal by the signal processing unit 13 only above a predetermined intensity threshold, in this case above a predetermined amplitude $A_T$ of the received signal $S_{RX}$. In the example shown in FIG. 5, the received signal $S_{RX}$ slowly fans out, reaches a maximum and then again contracts in terms of signal height. Only above the threshold value $A_T$ for the amplitude of the received signal $S_{RX}$ is the signal also evaluated as a received signal. FIG. 5 also shows that the duration $t_{RX}$ of the received signal $S_{RX}$ is also determined. This is done because this information is also used by the signal processing unit 13 to generate an output signal $S_{TX}$ which has a corresponding duration $t_{RX}$.

When processing the received signal $S_{RX}$, it is questionable when signal parts are to be evaluated as a coherent signal and when they possibly represent different signals. For this purpose, in the signal processing units 13 shown here, it is implemented as a detection methodology that such signal portions of a received signal $S_{RX}$, which have a predetermined minimum intensity $A_T$ or lie within a time window of predetermined size between two signal parts with predetermined minimum intensity $A_T$, are determined as a single coherent received signal. This procedure is illustrated in FIG. 5. In the uppermost part of the diagram, the continuous-time course of the received signal $S_{RX}$ is shown. As soon as signal components of the received signal $S_{RX}$ exceed the amplitude threshold $A_T$, this is detected and a corresponding carrier signal is generated, which can be seen in the middle diagram. The received signal $S_{RX}$ oscillating at a certain frequency thus generates an equidistant pulse train $S_{Imp}$. Each pulse of the pulse train $S_{Imp}$ resets a ramp generator, which is shown in the lower diagram in FIG. 5. The ramp generator generates a ramp signal with a certain edge steepness. Continuous resetting of the ramp generator by the pulse train $S_{Imp}$ produces the sawtooth curve shown in the bottom of FIG. 5. When the ramp generator is no longer reset because the received signal $S_{RX}$ no longer exceeds the predetermined intensity minimum, the signal generated by the ramp generator runs up unimpeded and exceeds a predetermined signal limit $A_B$. The time between the first triggering and the ramp generator and the subsequent exceeding of the signal threshold $A_B$ is then evaluated as the signal duration $t_{RX}$ of the received signal $S_{RX}$.

Figure 6:
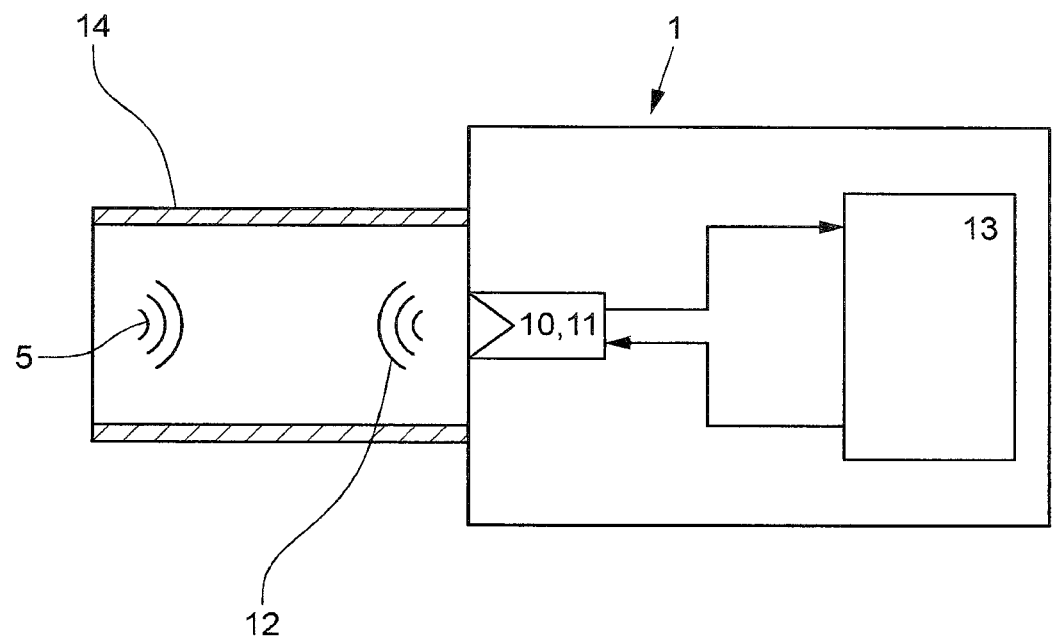
FIG. 6 is a schematic view of an exemplary of the test device according to the invention with a spacer.

FIG. 6 shows a special design feature in a test device 1, namely a spacer 14 with a defined length in the radiation direction of the test radiating element 11. In the present case, the spacer 14 is made of a material that absorbs ultrasonic waves. Also, the spacer can be coated with an ultrasonic wave absorbing coating. The embodiment shown in FIG. 6 has the advantage that the test device 1 can be placed at a defined distance from the distance sensor 2 to be tested or the mounting location of the distance sensor 2 to be tested.

Figure 7:
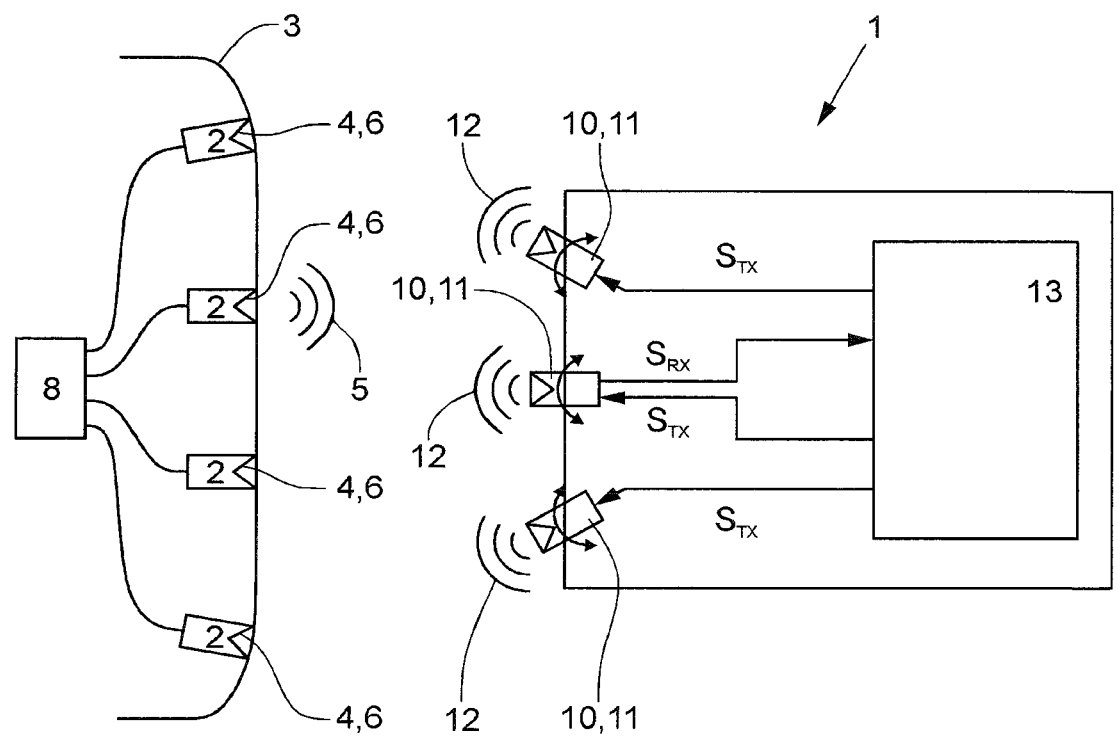
FIG. 7 is a schematic view of an exemplary of the test device according to the invention with several testing and radiating elements.

FIG. 7 shows a test device 1 with three test radiating elements 11. The special feature here is that the signal processing unit 13 determines several delayed excitation signals $S_{TX}$ for the test radiating elements 11 as a function of the received signal $S_{RX}$ and the simulation distance information $d_{test}$ and transmits them to the test radiating elements 11. The test radiating elements 11 generate corresponding test ultrasonic waves 12 and radiate them to the distance sensor 2 to be tested. The distance sensors 2 shown here are installed in a bumper 3 and connected to a control unit 8, which determines a complex image of the environment of the interconnected distance sensors 2 from a plurality of received signals of the distance sensors 2. With the test device 1 according to FIG. 7, it is therefore possible to simulate a physically consistent image of the environment even for a plurality of (interconnected) distance sensors 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A test device for testing a distance sensor operating with ultrasonic waves, the test device comprising:
   a test receiving element for receiving the ultrasonic waves emitted by the distance sensor to be tested;
   at least one test radiating element for radiating test ultrasonic waves; and
   a signal processing unit,
   wherein the ultrasonic waves received by the test receiving element are transmitted as a received signal to the signal processing unit,
   wherein the signal processing unit is configured to:
      determine a duration of the received signal deemed as a single coherent received signal based on
         resetting a ramp signal generator in response to an amplitude or an intensity of the received signal exceeding a first threshold,
         determining a start of the duration based on the ramp signal generator being initially reset in response to the received signal, and
         determining an end of the duration based on the output of the ramp signal generator exceeding a second threshold;
      generate an excitation signal based on delaying, with respect to the received signal according to simulation distance information relating to a distance to be simulated, a copy of signal components of the received signal within the determined duration; and transmit the excitation signal to the test radiating element, wherein the test radiating element is configured to generate the test ultrasonic waves based on the excitation signal and radiate the test ultrasonic waves to the distance sensor to be tested.

2. The test device according to claim 1, wherein test device distance information relating to a distance between the test device and the distance sensor to be tested is stored in the test device, and wherein the signal processing unit is configured to determine the excitation signal further based on the test device distance information.

3. The test device according to claim 1, wherein the excitation signal and thus the test ultrasonic waves have a frequency, wherein the frequency is constant or time-variable for simulating a change in distance.

4. The test device according to claim 1,
wherein the received signal is sampled at a sampling frequency by the signal processing unit and stored as sampled received signal,
wherein the sampled received signal is transmitted at least indirectly as an output signal to the at least one test radiation element, and
wherein the sampling frequency is at least twice as high or at least ten times as high as a frequency of the ultrasonic waves emitted by the distance sensor to be tested.

5. The test device according to claim 1, wherein a spacer with a defined length is arranged in a radiation direction of the at least one test radiating element such that the test device is placed at a defined distance from the distance sensor to be tested or a mounting location of the distance sensor to be tested.

6. The test device according to claim 1,
wherein the at least one test radiating element includes a plurality of test radiating elements,
wherein the signal processing unit is configured to determine a plurality of delayed excitation signals for the plurality of test radiating elements as a function of the received signal and the simulation distance information and transmits them to the test radiating elements, and
wherein the test radiating elements generate corresponding test ultrasonic waves of the test ultrasonic waves and radiate the test ultrasonic waves to the distance sensor to be tested or to a plurality of sensor receiving elements of the distance sensor to be tested.

7. The test device according to claim 2, wherein an amplitude of the excitation signal is determined by the signal processing unit as a function of a corresponding amplitude of the received signal, as a function of the simulation distance information, or as a function of the test device distance information, or a combination thereof.

8. The test device according to claim 7, wherein the amplitude of the excitation signal is determined by the signal processing unit further as a function of an object information of an object or as a function of an effective reflection surface of the object and/or reflection properties of the reflection surface of the object and/or a contour of the reflection surface of the object.

9. The test device according to claim 2,
wherein the signal processing unit is configured to operate the test device as another distance sensor, wherein a measurement signal is transmitted via the at least one test radiating element and a reflected measurement signal is detected by the test receiving element, the reflected measurement signal being transmitted as a received measurement signal to the signal processing unit, and
wherein the signal processing unit is configured to determine a signal propagation time and determine measured distance information from the signal propagation time, and wherein the measured distance information is stored as the test device distance information.

\* \* \* \* \*